United States Patent
Wood et al.

(10) Patent No.: US 12,025,055 B1
(45) Date of Patent: Jul. 2, 2024

(54) VARIABLE GEOMETRY INLET FOR TURBOPROPELLER INLET PRESSURE RECOVERY OPTIMIZATION

(71) Applicant: General Electric Company, Schenectady, NY (US)

(72) Inventors: Trevor H. Wood, Clifton Park, NY (US); Michael J. McMahon, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/158,690

(22) Filed: Jan. 24, 2023

(51) Int. Cl.
  *F02C 7/042* (2006.01)
  *F02C 7/057* (2006.01)

(52) U.S. Cl.
  CPC .............. *F02C 7/042* (2013.01); *F02C 7/057* (2013.01); *F05D 2220/323* (2013.01); *F05D 2240/12* (2013.01); *F05D 2260/60* (2013.01); *F05D 2260/96* (2013.01)

(58) Field of Classification Search
  CPC .......... F02C 7/042; F02C 7/045; F02C 7/057; F05D 2220/323; F05D 2240/12; F05D 2260/60; F05D 2260/96; B64D 33/02; B64D 2033/0206; B64D 2033/0226; B64D 2033/0293; F01D 25/24
  See application file for complete search history.

(56) References Cited

U.S. PATENT DOCUMENTS

| | | | |
|---|---|---|---|
| 3,532,129 A | 10/1970 | Ward et al. | |
| 4,881,367 A | 11/1989 | Flatman | |
| 5,000,399 A | 3/1991 | Readnour et al. | |
| 5,961,067 A | 10/1999 | Hall et al. | |
| 8,181,905 B2 | 5/2012 | McDonough et al. | |
| 8,689,538 B2 | 4/2014 | Sankrithi et al. | |
| 9,297,333 B2 | 3/2016 | Filter | |
| 9,738,392 B2 | 8/2017 | Hellegouarch et al. | |
| 10,260,417 B2 | 4/2019 | Wood et al. | |
| 11,040,767 B2 | 6/2021 | Wood et al. | |
| 11,066,993 B2 | 7/2021 | Labrecque et al. | |
| 2017/0175627 A1* | 6/2017 | Wood | B64D 33/02 |
| 2017/0284297 A1* | 10/2017 | Nestico | F02C 9/20 |
| 2019/0161167 A1* | 5/2019 | Wood | B64C 11/14 |
| 2022/0154651 A1 | 5/2022 | Bowden | |

FOREIGN PATENT DOCUMENTS

| | | |
|---|---|---|
| FR | 3060661 B1 | 10/2020 |
| GB | 1410160 A | 10/1975 |

OTHER PUBLICATIONS

Academic Dictionaries and Encyclopedias, "Aviation dictionary: variable inlet," accessed on Nov. 2, 2022 at <https://aviation_dictionary.en-academic.com/7106/variable_inlet>.

* cited by examiner

*Primary Examiner* — Elton K Wong
(74) *Attorney, Agent, or Firm* — Venable LLP; Michele V. Frank

(57) ABSTRACT

A turboprop engine includes a main nacelle body, a rotatable hub provided on the main nacelle body, a plurality of propellers connected to the rotatable hub, and a nacelle extension coupled to the main nacelle body, the nacelle extension including at least one wall defining an air intake inlet. The air intake inlet is movable in an airflow axis with respect to a trailing edge of a propeller in the plurality of propellers to vary a distance between the air intake inlet and the trailing edge of the propeller during various phases of operation of the turboprop engine.

20 Claims, 5 Drawing Sheets

VARIABLE GEOMETRY INLET FOR TURBOPROPELLER INLET PRESSURE RECOVERY OPTIMIZATION

TECHNICAL FIELD

The present disclosure relates generally to turbo-propeller engines and, in particular, to turboprop engines having a variable geometry inlet and a method of optimizing inlet pressure recovery using the variable geometry inlet.

BACKGROUND

Some aircrafts use turbo-propeller (turboprop) engines. Turboprop engines are provided with air intake inlets. Most known air inlets for turboprop engines are positioned a distance behind propellers to receive air for the turboprop engine. When a propeller passes in front of the air intake inlet, aerodynamic loading increases temporarily until the propeller rotates away from the air intake inlet. Airflow around the propeller reacts with the flow-field distortion created by the engine inlet and results in fluctuating forces on the propeller that increase noise generated by the propeller. Furthermore, the airflow on the propeller can weaken during this interaction effect, thereby increasing the flow distortion in the propeller wakes that propagate and hit a lip of the air intake inlet, thereby creating a pressure fluctuation that radiates acoustically, causing a further increase in the noise generated. The unsteady aerodynamic interaction between the propeller and the air intake inlet on a typical turboprop engine leads to additional sound generation, thereby adding to sound annoyance for passengers on the aircraft and communities on the ground. In addition, the unsteady aerodynamic interaction between the propeller and the air intake inlet on a typical turboprop engine can also lead to a decrease in overall efficiency of the propeller and power generation by the turboprop engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
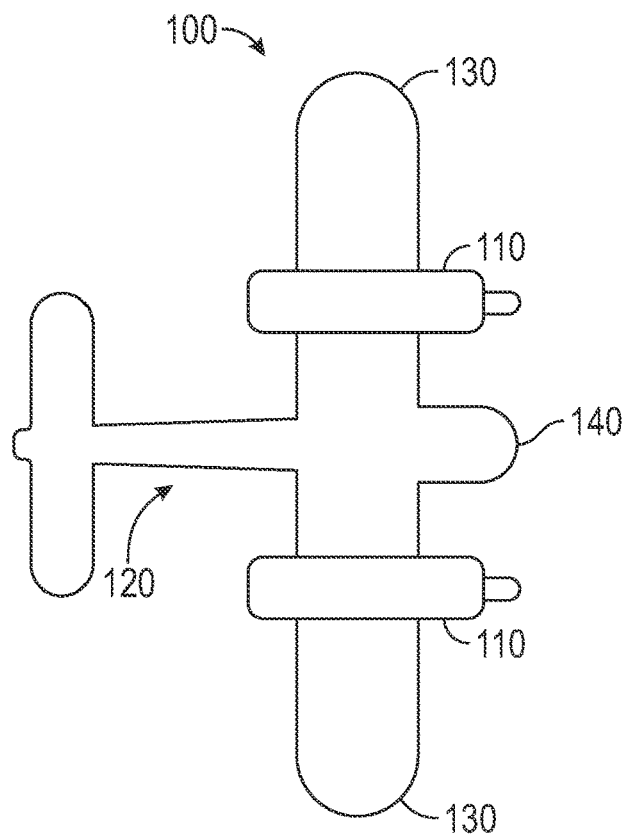
FIG. 1 is a top plan view of an aircraft having turboprop engines, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure seek to provide a variable geometry inlet (VGI) that translates its axial position with respect to a trailing edge of the propeller to optimize inlet pressure recovery of a turboprop engine. Conventionally, turboprop inlets are placed close behind a propeller to capture pressure rise effects of the propeller. However, in certain flight conditions, placing the inlet too close to the propeller trailing edge can adversely affect the propeller aerodynamic performance, thereby also affecting the inlet total pressure due to interaction between the air intake inlet and the propeller. Therefore, according to an embodiment of the present disclosure, the variable geometry inlet is movable to keep the air intake inlet at optimum distance from the propeller as aircraft flight condition varies between takeoff, climb, cruise, and descent.

By varying the spacing or the gap between the propeller and the engine air intake, the pressure recovery can be optimized while accounting for installation effects between the propeller and air intake inlet that change with flight condition, or engine operation. By using a variable geometry inlet, the spacing between the inlet and the propeller can be dynamically selected to best capture turbocharging from the propeller while avoiding negative effects of impulsively back pressurizing of the propeller. In current conventional systems, the spacing between the air intake inlet and the propeller is selected to be a fixed position that would be optimized for a specific flight condition without any possibility to vary or move the spacing during flight. However, the fixed position may not be appropriate for the rest of the flight envelope and can, thus, have suboptimal air recovery and noise levels.

Control of the movement of the variable geometry inlet can be determined based on flight Mach (M) compared to inlet Mach ($M_i$). For example, it may be desirable to provide a first spacing between the air intake inlet and the trailing edge of the propeller for flight Mach less than inlet Mach ($M<M_i$) and to provide a second spacing between the air intake inlet and the trailing edge of the propeller for flight Mach greater than inlet Mach ($M>M_i$), such that the first spacing is greater than the second spacing. However, the spacing between the air intake inlet and the trailing edge of the propeller needs to be sufficiently long when $M>M_i$ to prevent causing flow separation at a root of the propeller due to the back-pressure effect of the air intake inlet flow deceleration.

By using a movable variable geometry inlet that is adapted to various flight conditions of the aircraft or operation of the aircraft, the power efficiency of the turboprop engine can be increased in certain flight conditions. In addition, by using a movable variable geometry inlet, risk of backflow in inertial particle bypass air through particle separators can be decreased without using an active blower. This can increase turboprop operating regime with higher overall pressure recoveries. In addition, the overall power of the turboprop engine can be increased.

FIG. 1 is a top plan view of an aircraft 100 having turboprop engines 110, according to an embodiment of the present disclosure. The aircraft 100 includes a fuselage 120, and a pair of wings 130 coupled to the fuselage 120. The turboprop engines 110 are coupled to the wings 130. In other embodiments, a single turboprop engine 110 can be coupled to fuselage 120 at a nose 140 of the aircraft 100 or coupled to any other part of the aircraft 100 that allows the aircraft 100 to fly properly.

Figure 2:
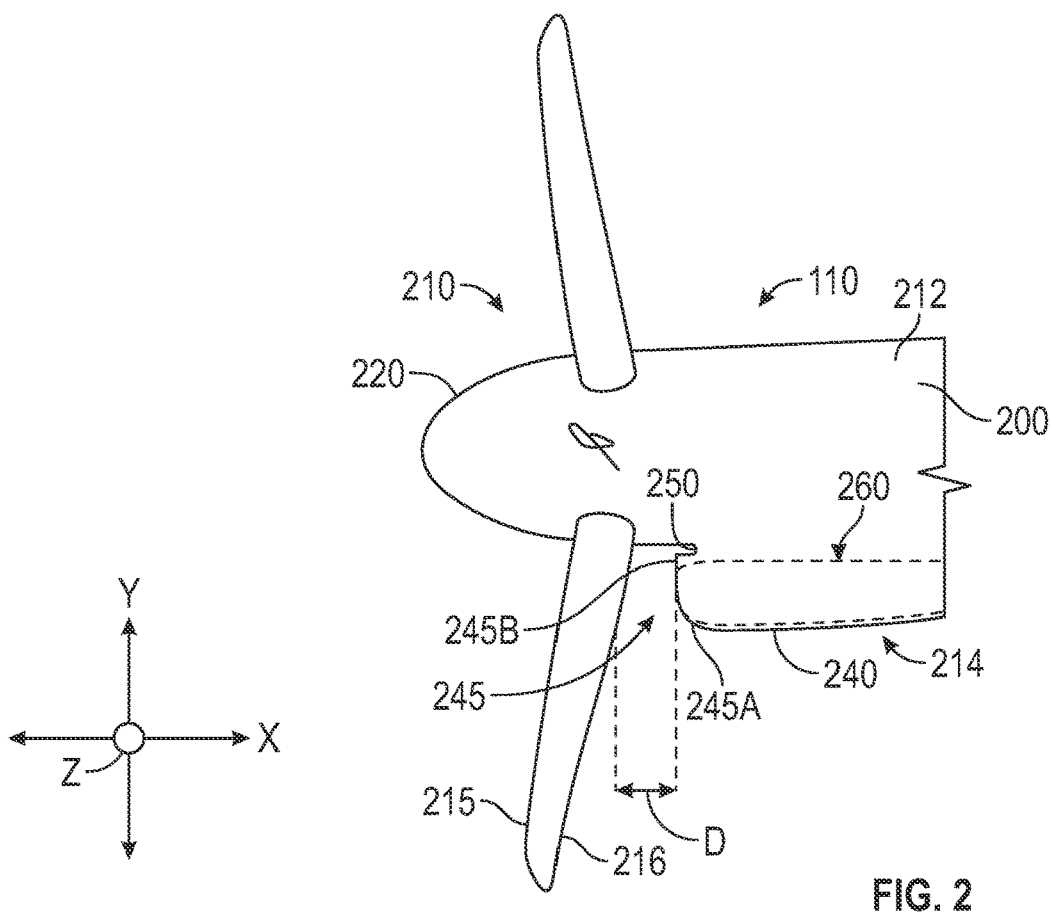
FIG. 2 is a side elevational view of a turboprop engine used in the aircraft, shown in FIG. 1, according to an embodiment of the present disclosure.

FIG. 2 is a side elevational view of the turboprop engine 110 used in the aircraft 100, shown in FIG. 1, according to an embodiment of the present disclosure. Turboprop engine 110 has a housing 200 that defines a nacelle 210. The nacelle 210 includes a main nacelle body 212 and a nacelle extension 214. In an embodiment, the nacelle extension 214 is coupled to the main nacelle body 212. In another embodiment, the nacelle extension 214 is integrated as one body with main nacelle body 212. Turboprop engine 110 also includes a plurality of propellers 215 that are coupled to a rotatable hub 220. The rotatable hub 220 is connected to rotatable shaft (shown schematically in FIG. 5) that is in turn connected to a turbine (shown schematically in FIG. 5) provided within main nacelle body 212, via a gearbox (not shown). The nacelle extension 214 includes at least one wall 240 that defines an air intake inlet 245. The air intake inlet 245 is spaced apart a distance D from a trailing edge 216 of propellers 215 to receive air for fuel combustion in a suitable combustor (not shown) of the turboprop engine 110 within the nacelle 210.

In one embodiment, a flow diverter 250 is provided extending between the nacelle extension 214 and the main nacelle body 212. The main nacelle body 212 defines three orthogonal axes along a vertical axis Y, a lateral axis Z, and an airflow axis X. In an embodiment, the main nacelle body 212 is generally cylindrically shaped and extends from the tip of rotatable hub 220 along airflow axis X towards the rear of the aircraft 100 (FIG. 1). The nacelle extension 214 is positioned underneath the main nacelle body 212, in the vertical direction Y. In an embodiment, the nacelle extension 214 can be positioned at any angle relative to axes Y and Z. For example, the nacelle extension 214 can be positioned such that a center of the air intake inlet 245 is located at "six o'clock" about the axis Y. In another embodiment, the nacelle extension 214 can be positioned such that a center of the air intake inlet 245 forms an angle α relative to the vertical axis Y (for example, 10 deg. to 90 deg. relative to the vertical axis Y) in the plane defined by axis Y and axis Z.

The air intake inlet 245 can have any shape including, but not limited to, round, circular, oval, polygonal (rectangular, octagonal, hexagonal, etc.) or any other irregular shape. In an embodiment, the air intake inlet 245 can have a round or a rectangular shape in the plane defined by the axes Y and Z. The air intake inlet 245 defines an end of an air duct 260 shown as a dotted line that is provided within the nacelle extension 214. The air duct 260 extends along airflow axis X from air intake inlet 245 towards the rear of the aircraft 100 (FIG. 1).

Figure 3A:
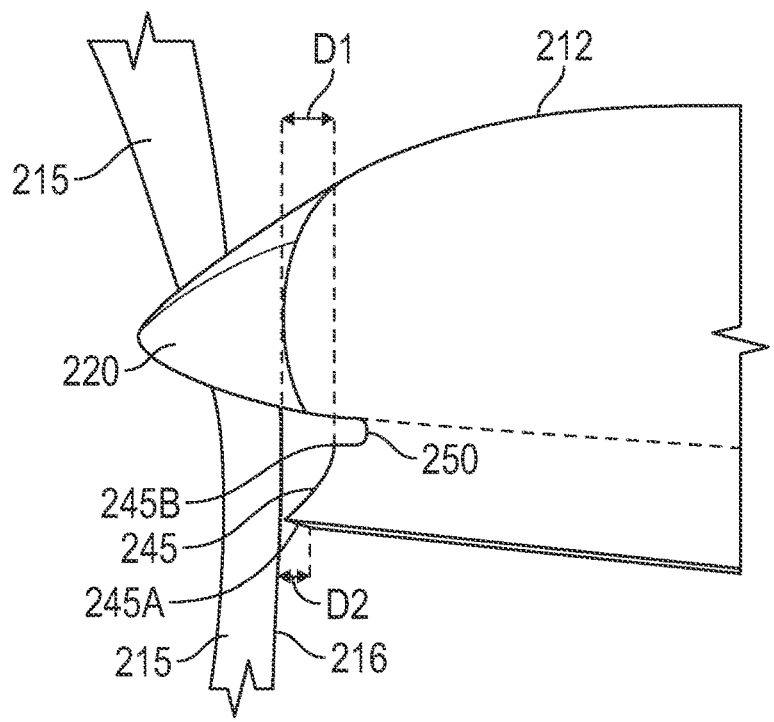
FIGS. 3A and 3B are schematic side elevational views of an air intake inlet, according to an embodiment of the disclosure.
Figure 3B:
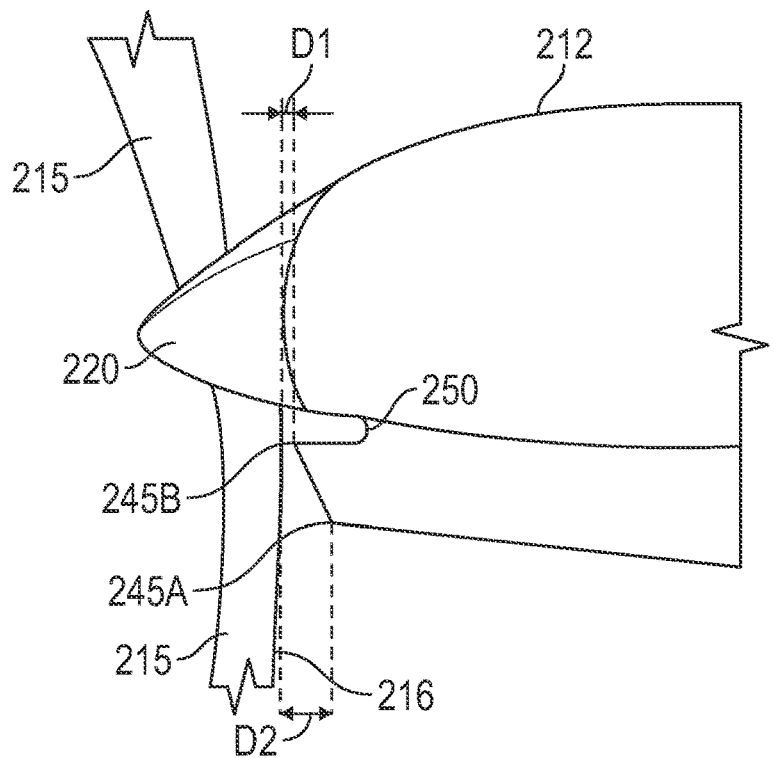

FIGS. 3A and 3B are schematic side elevational views of an air intake inlet, according to an embodiment of the disclosure. As shown in FIGS. 3A and 3B, the air intake inlet 245 can be provided with an outer lip 245A and an inner lip 245B. The outer lip 245A is outer (i.e., radially outward with respect to the propeller rotation axis) than the inner lip 245B. The inner lip 245B (i.e., radially inward) is provided closer to the main nacelle body 212 than the outer lip 245A. The inner lip 245B is separated from the main nacelle body 212 by the flow diverter 250. As shown in FIG. 3A, in an embodiment, the air intake inlet 245 can be shaped such that the outer lip 245A of the air intake inlet 245 extends closer to the trailing edge 216 of the propeller 215 than the inner lip 245B such that a distance D2 from the outer lip 245A to the trailing edge 216 of the propeller 215 is less than the distance D1 from the inner lip 245B to the trailing edge 216 of the propeller 215.

As shown in FIG. 3B, in another embodiment, the air intake inlet 245 can be shaped such that the outer lip 245A of the air intake inlet 245 extends farther from the trailing edge 216 of the propeller 215 than the inner lip 245B, such that a distance D2 from the outer lip 245A to the trailing edge 216 of the propeller 215 is greater than the distance D1 from the inner lip 245B to the trailing edge 216 of the propeller 215. These two configurations may allow further control of the air flow at the air intake inlet 245.

Figure 4:
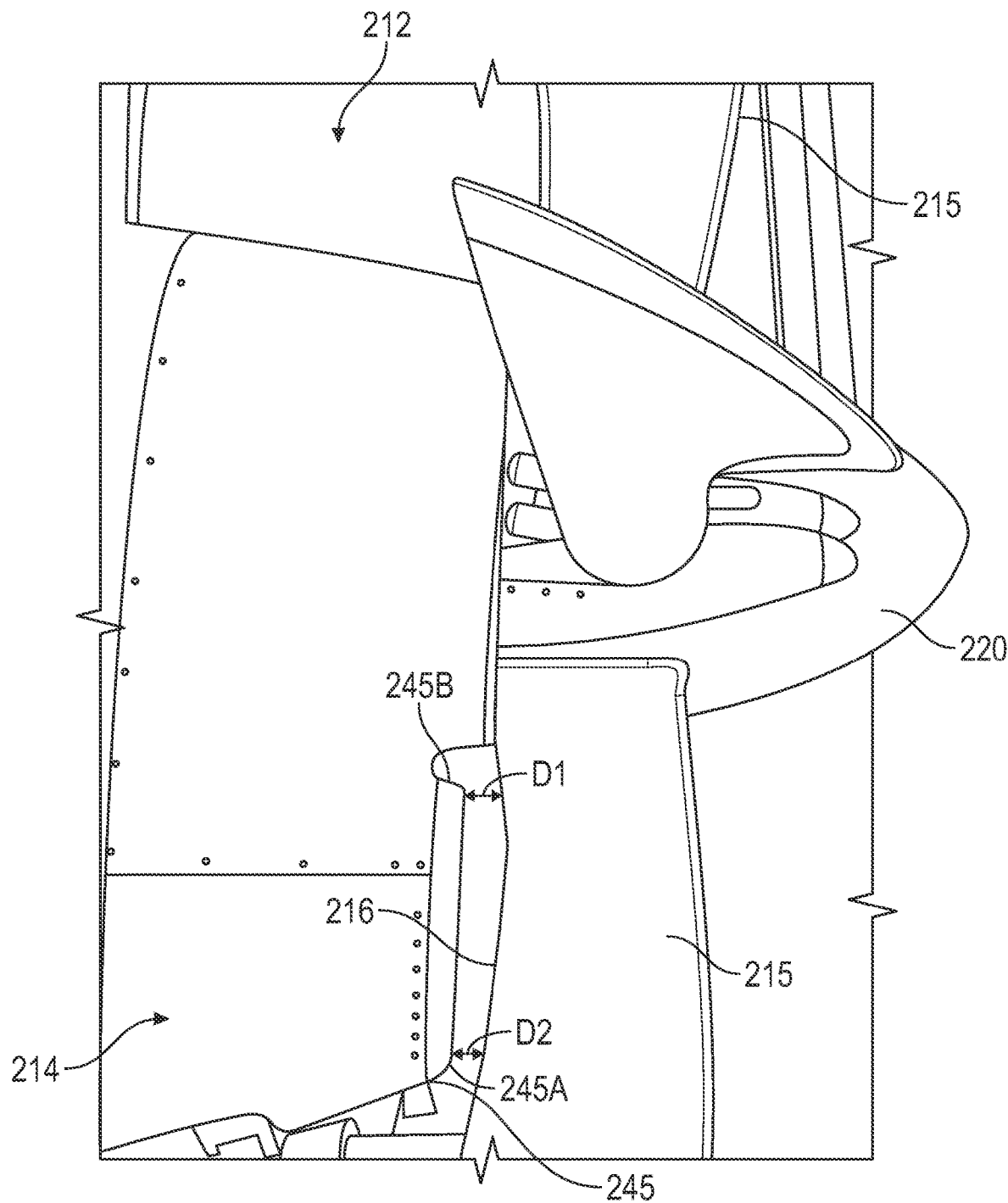
FIG. 4 is a side elevational view of an air intake inlet, according to an embodiment of the disclosure.

FIG. 4 is a side elevational view of an air intake inlet, according to an embodiment of the disclosure. In the embodiment of FIG. 4, the air intake inlet 245 can be shaped such that the outer lip 245A of the air intake inlet 245 and the inner lip 245B are substantially equally spaced from the trailing edge 216 of the propeller 215 such that the distance D2 between the outer lip 245A and the trailing edge 216 of the propeller 215 is substantially equal to the distance D1 between the inner lip 245B and the trailing edge 26 of the propeller 215.

Figure 5:
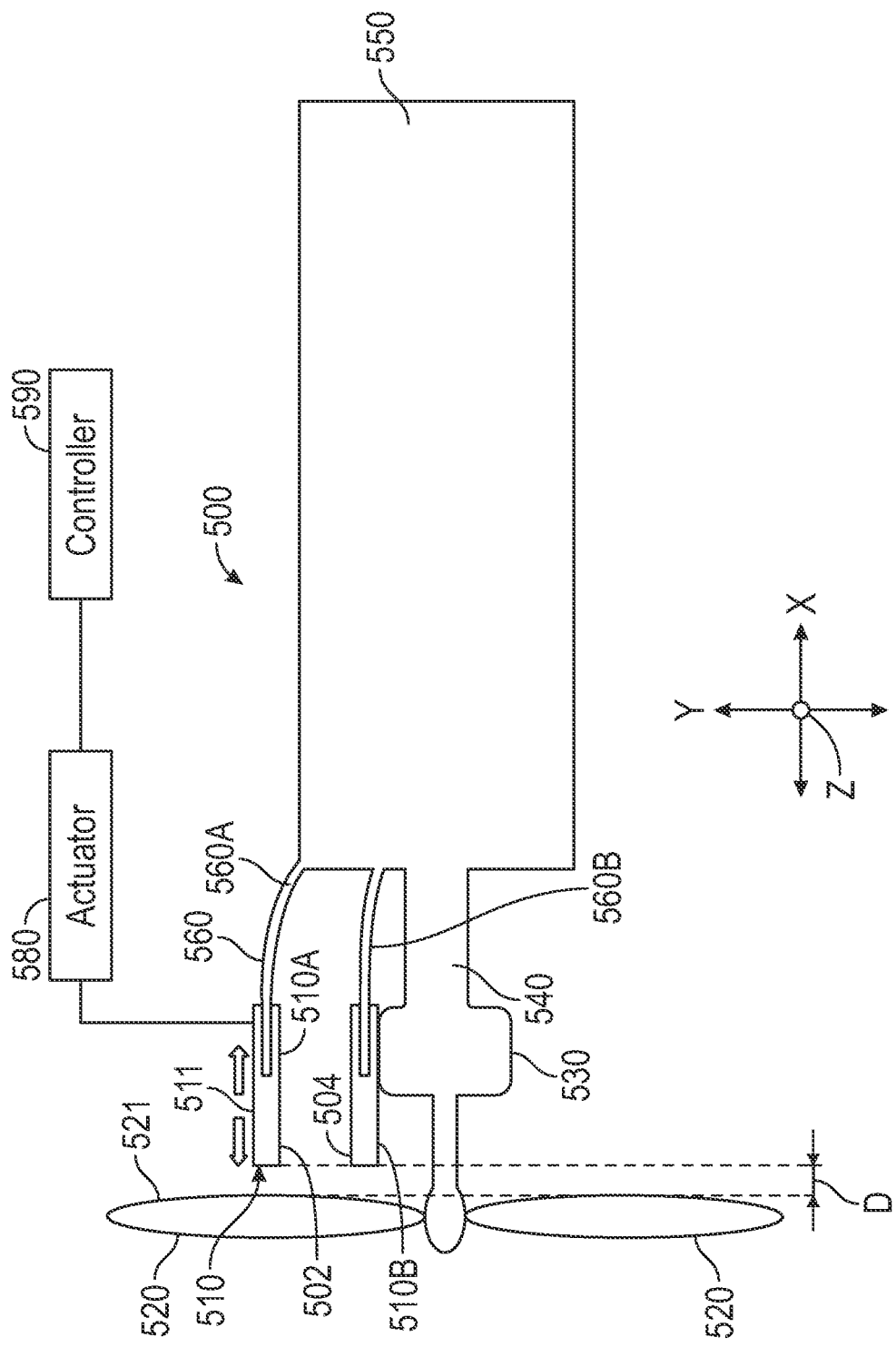
FIG. 5 is a schematic representation of a turboprop engine having an air intake inlet and a plurality of propellers, according to an embodiment of the present disclosure.

FIG. 5 is a schematic representation of a turboprop engine 500 having an air intake inlet and a plurality of propellers 520, according to an embodiment of the present disclosure. The turboprop engine 500 can be used in the aircraft 100 shown in FIG. 1. As shown in FIG. 5, the plurality of propellers 520 are coupled to a rotatable hub 530 that in turn is coupled to a shaft 540 that is in turn connected to a turbine 550. As shown in FIG. 5, an air intake inlet 510 is connected to an air duct 560 provided within the nacelle extension 214 (shown in FIG. 2). The air duct 560 is in turn connected to the turbine 550. The turbine 550 is provided within the main nacelle body 212 (shown in FIG. 2). The air intake inlet 510 is a variable geometry inlet (VGI) that translates axially along airflow axis X with respect to a trailing edge 521 of the propeller 520 to optimize air intake inlet pressure recovery of the turboprop engine 500. The air intake inlet 510 having a variable geometry inlet is movable in the airflow axis direction to keep the air intake inlet 510 at an optimum distance D from the propeller 520 as flight conditions vary, such as when the aircraft is on land before take-off, after landing and during various phases of flight (e.g., ascent, cruise, and descent). By varying the spacing or the distance D between the air intake inlet 510 and the trailing edge of the propeller 520, the air pressure recovery can be optimized while accounting for installation effects between the propeller 520 and the air intake inlet 510 that change with flight conditions during various phases of operation of the turboprop engine 500 (e.g., before takeoff, after landing, during the ascent of the aircraft, the cruise of the aircraft, and the descent of the aircraft).

In an embodiment, the air intake inlet 510 includes a sheathing 511 that is fitted over a portion of the air duct 560. The air intake inlet 510 is movable relative to the trailing edge 521 of the propeller 520 (as shown by the double opposing arrows in FIG. 5) by moving, sliding, or translating the sheathing 511 relative to the air duct 560 using an actuator 580. The actuator 580 is controlled by a controller 590. The controller 590 is configured to send a control signal to the actuator 580 to control the movement, and, thus, the position of the sheathing 511 of the air intake inlet 510 relative to the trailing edge 521 of the propeller 520 during taxi, take-off, climb, cruise, landing, and various phases of flight of the aircraft 100 (FIG. 1) (i.e., various phases of operation of the turboprop engine 500), for example, during the ascent of the aircraft 100, the cruise of the aircraft 100, and the descent of the aircraft 100.

By using air intake inlet 510 as a variable geometry inlet, the spacing D between the air intake inlet 510 and the trailing edge 521 of the propeller 520 can be dynamically selected by controlling the actuator 580 using the controller 590 to best capture turbocharging from the propeller 520 while avoiding negative effects of back pressurizing of the propeller 520.

Control of the movement of the air intake inlet 510 as a variable geometry inlet can be determined based on flight Mach (M) compared to inlet Mach ($M_i$). Inlet Mach ($M_i$) is a Mach number normal to a plane across the air intake inlet 510. In other words, a velocity vector of the incoming airflow is inline with the centerline of the intake inlet 510 at the forward most plane of the air duct 560. For example, it is desirable to provide a first spacing or distance between the air intake inlet 510 and the trailing edge 521 of the propeller 520 for flight Mach less than inlet Mach ($M<M_i$) and to provide a second spacing or distance between the air intake inlet 510 and the trailing edge 521 of the propeller 520 for flight Mach greater than inlet Mach ($M>M_i$), such that the first spacing is greater than the second spacing. The spacing or the distance D between the air intake inlet 510 and the trailing edge 521 of the propeller 520 can be selected to be of sufficient length when $M>M_i$ to prevent causing flow separation at a spanwise portion of the propeller 520 proximal the root which is interacting with the inlet airflow stream.

In another embodiment, instead of providing the air intake inlet 510 with a sheathing 511 that is movable relative to the air duct 560 and the trailing edge 521 of propeller 520, the air intake inlet 510 is instead provided with a plurality of sheathing portions, and more particularly an outer lip sheathing portion 510A and an inner lip sheathing portion 510B, that can be independently movable relative to the air duct 560 and the trailing edge 521 of propeller 520. The outer sheathing portion 510A defines a radially outer lip 502 of the air intake inlet 510 and the inner sheathing portion 510B defines an inner lip 504 of the air intake inlet 510. In an embodiment, the outer sheathing portion 510A can be provided or movably coupled to an outer portion 560A of the air duct 560 and the inner sheathing portion 510B can be provided or coupled to an inner portion 560B of the air duct 560. In an embodiment, the outer sheathing portion 510A and the inner sheathing portion 510B are independently movable with respect to each other. In this way, the outer sheathing portion 510A and the inner sheathing portion 510B can be extended at different extents so that the outer sheathing portion 510A and the inner sheathing portion 510B are spaced away from the trailing edge 521 of the propeller 520 at different distances D1 and D2, for example. This configuration provides the same features as the configurations shown in FIGS. 3A and 3B. However, in addition to the benefits described with respect to the embodiments depicted in FIGS. 3A and 3B, the embodiment shown in FIG. 5 with the plurality of sheathing portions 510A and 510B further provides independent control of the spacing of each of the sheathing portions 510A and 510B during the operation of the aircraft 100 (FIG. 1). This allows even further enhanced control of air flow through the air intake inlet 510.

By using a movable variable geometry inlet that is adapted to various flight conditions of the aircraft, the power efficiency of the turboprop engine can be increased in certain flight conditions. In addition, by using a movable variable geometry inlet, risk of backflow in inertial particle bypass air through particle separators is decreased without using an active blower. This can increase the turboprop operating regime with higher overall pressure recoveries. In addition, the overall power of the turboprop engine can be increased.

Furthermore, noise levels within the passenger cabin can be controlled and decreased. The noise level with and without the air intake inlet 510 being extended, according to an embodiment of the present disclosure, can operate such that the propeller inlet interaction effects are optimally minimized during all operating conditions during flight, thereby achieving a minimal noise level for the given propeller and engine system. In some turboprop configurations, this can be used to achieve reduced noise for the cabin interior experienced by passengers onboard the aircraft as well as far field noise radiated to the community nearby the airport during takeoff and landing operations.

Figure 6:
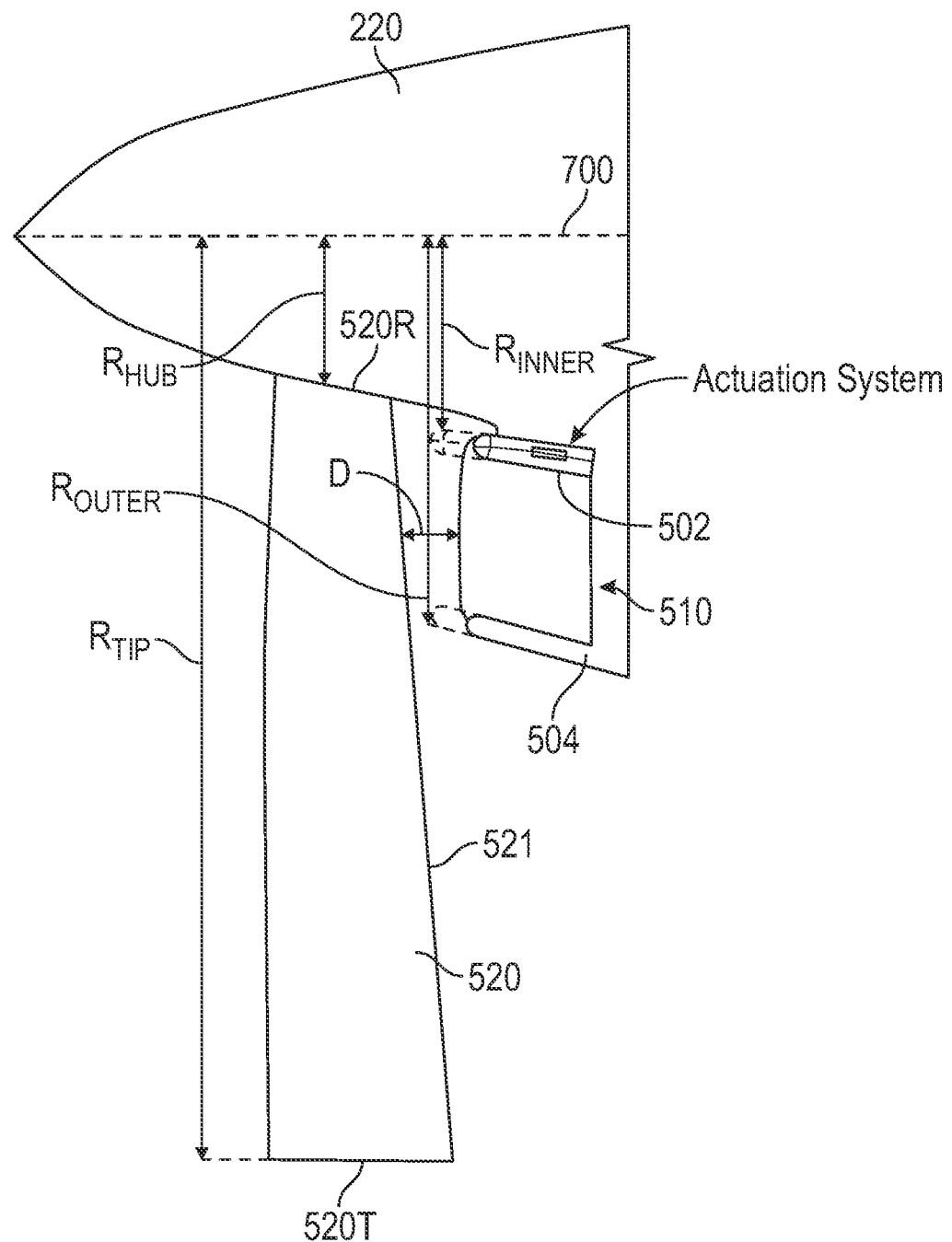
FIG. 6 shows various spacing of a rotatable hub, a propeller, an inner lip, and a outer lip of an air intake inlet relative to an axis of rotation of the rotatable hub, according to an embodiment of the present disclosure.

FIG. 6 shows varying spacing of the rotatable hub 220, the propeller 520, the outer lip 502, and the inner lip 504 of the air intake inlet 510 relative to an axis of rotation 700 of the rotatable hub 220, according to an embodiment of the present disclosure. A distance from the axis of rotation 700 of the rotatable hub 220 to a tip 520T of the propeller 520 is noted as $R_{TIP}$. A distance from the axis of rotation 700 of the rotatable hub 220 to a root 520R of the propeller 520 is noted as $R_{HUB}$. A distance from the axis of rotation 700 of the rotatable hub 220 to the outer lip 502 of the air intake inlet 510 is noted as $R_{INNER}$. A distance from the axis of rotation 700 of the rotatable hub 220 to the inner lip 504 of the air intake inlet 510 is noted as $R_{OUTER}$.

In an embodiment, $R_{HUB}$ and $R_{INNER}$ are between about 0.15 $R_{TIP}$ and about 0.25 $R_{TIP}$ (for example, about 0.2 $R_{TIP}$). In an embodiment, $R_{INNER}>R_{HUB}$ to prevent boundary layer ingestion into the air intake inlet 510. In an embodiment, $R_{OUTER}$ can be between about 0.4 $R_{TIP}$ and about 0.45 $R_{TIP}$. In an embodiment, the distance from the air intake inlet 510 to the trailing edge 521 of the propeller 520 depends on the design of the aircraft 100 (FIG. 1) including propeller chord, propeller pitch change axis (PCA) location, flight envelope and/or operating conditions, etc.). For example, a distance D from the air intake inlet 510 to the trailing edge 521 of propeller 520 varying between 0.05 $R_{TIP}$ to 0.3 $R_{TIP}$ is an acceptable range to operate the variable spacing D within. The term "propeller chord" refers to a distance from the leading edge to the trailing edge of the propeller airfoil at a particular location between the root and tip. PCA refers to the axis that the propeller rotates about to change pitch. Flight Envelope refers to the conditions the aircraft can fly within in terms of altitude, airspeed, and temperature.

In another embodiment, instead of providing the air intake inlet 510 being movable with respect to the air duct 560 and the trailing edge 521 of propeller 520, the propeller 520 can instead be configured to move with respect to the air intake inlet 510, which can be fixed in position or be movable. In yet another embodiment, in addition or alternatively, the propeller 520 can be configured to twist to change pressure loading from the root 520R of the propeller 520 to the tip 520T of the propeller 520. In this way, the propeller can be designed such that more aerodynamic pressure loading can be placed radially away from the air intake airstream flowing into inlet 510, as described, for example, in U.S. Pat. No. 11,040,767 issued on Jun. 22, 2021, the entire content of which is incorporated herein by reference.

Further aspects of the present disclosure are provided by the subject matter of the following clauses:

A turboprop engine including a main nacelle body, a rotatable hub provided on the main nacelle body, a plurality of propellers connected to the rotatable hub, and a nacelle extension coupled to the main nacelle body, the nacelle extension having at least one wall defining an air intake inlet. The air intake inlet is movable in an airflow axis with respect to a trailing edge of a propeller in the plurality of propellers to vary a distance between the air intake inlet and the trailing edge of the propeller during various phases of operation of the turboprop engine.

The turboprop engine of the preceding clause, further including an air duct provided within the nacelle extension, the air duct being configured to provide air to a turbine provided within the main nacelle body. The air intake inlet includes a sheathing fitted over a portion of the air duct, the sheathing being configured to move relative to the air duct and the trailing edge of the propeller to vary a distance between the sheathing and the trailing edge of the propeller to optimize the air pressure recovery during the various phases of operation of the turboprop engine (e.g., takeoff, climb, cruise, and descent of the aircraft).

The turboprop engine of any preceding clause, wherein the sheathing includes a first sheathing portion and a second sheathing portion, the first sheathing portion defining an inner lip of the inlet and the second sheathing portion defining a outer lip of the inlet, the first sheathing portion being movably coupled to an inner portion of the air duct and the second sheathing portion being movably connected to an outer portion of the air duct.

The turboprop engine of any preceding clause, wherein the first sheathing portion and the second sheathing portion are independently movable with respect to each other so that the first sheathing portion is extendable to a first distance from the trailing edge of the propeller and the second sheathing portion is extendable to a second distance from the trailing edge of the propeller, the second distance being different from the first distance.

The turboprop engine of any preceding clause, further including a flow diverter extending between the nacelle extension and the main nacelle body, wherein the inner lip of the air intake inlet is separated from the main nacelle body by the flow diverter.

The turboprop engine of any preceding clause, further including an actuator configured to move the sheathing relative to the air duct and the trailing edge of the propeller to vary the distance between the sheathing and the trailing edge of the propeller to affect the air pressure recovery during the various phases of operation of the turboprop engine.

The turboprop engine of any preceding clause, further including a controller in communication with the actuator, the controller being configured to send a control signal to the actuator to control a movement and position of the sheathing relative to the trailing edge of the propeller during taxi, take-off, landing, and the various phases of operation of the turboprop engine.

The turboprop engine of any preceding clause, wherein the distance between the air intake inlet and the trailing edge of the propeller is selected to be a first distance for flight Mach less than inlet Mach (M<Mi) and the distance between the air intake inlet and the trailing edge of the propeller is selected to be a second distance for flight Mach greater than inlet Mach (M>Mi), the first distance being greater than the second distance.

The turboprop engine of any preceding clause, wherein the distance between the inlet and the trailing edge of the propeller are continuously and dynamically modified to capture turbocharging from the propeller while avoiding negative effects of back pressuring of the propeller.

The turboprop engine of any preceding clause, wherein the air intake inlet comprises a outer lip and an inner lip, the inner lip being radially closer to the main nacelle body than the outer lip, the inner lip being separated from the main nacelle body by a flow diverter.

The turboprop engine of any preceding clause, wherein the outer lip extends closer to the trailing edge of the propeller than the inner lip such that a distance from the outer lip to the trailing edge of the propeller is less than or equal to a distance from the inner lip to the trailing edge of the propeller.

The turboprop engine of any preceding clause, wherein the outer lip extends farther from the trailing edge of the propeller than the inner lip such that the distance from the outer lip to the trailing edge of the propeller is greater than or equal to the distance from the inner lip to the trailing edge of the propeller.

The turboprop engine of any preceding clause, wherein $R_{TIP}$ is a distance from an axis of rotation of the rotatable hub to a tip of the propeller, wherein $R_{HUB}$ is a distance from the axis of rotation of the rotatable hub to a root of the propeller, wherein $R_{INNER}$ is a distance from the axis of rotation of the rotatable hub to the inner lip, wherein $R_{OUTER}$ is a distance from the axis of rotation of the rotatable hub to the outer lip, wherein $R_{HUB}$ and $R_{INNER}$ are between about 0.15 $R_{TIP}$ and about 0.25 $R_{TIP}$, and wherein $R_{OUTER}$ is between about 0.35 $R_{TIP}$ and about 0.45 $R_{TIP}$.

The turboprop engine of any preceding clause, wherein $R_{INNER}$ is greater than $R_{HUB}$ to prevent boundary layer ingestion into the air intake inlet.

The turboprop engine of any preceding clause, wherein the distance between the air intake inlet and the trailing edge of the propeller is between 0.15 $R_{TIP}$ to 0.3 $R_{TIP}$.

A method of optimizing inlet pressure recovery in a turboprop engine including a main nacelle body, a rotatable hub provided on the main nacelle body, a plurality of propellers connected to the rotatable hub, and a nacelle extension coupled to the main nacelle body, the nacelle extension comprising at least one wall defining an air intake inlet. The method includes moving the air intake inlet in an airflow axis with respect to a trailing edge of a propeller in the plurality of propellers, and varying, during various phases of operation of the turboprop engine, a distance between the air intake inlet and the trailing edge of the propeller in the plurality of propellers.

The method of the preceding clause, wherein moving the air intake inlet with respect to the trailing edge of the propeller comprises moving a sheathing relative to an air duct within the nacelle extension for providing air to a turbine provided within the main nacelle body and the trailing edge of the propeller.

The method of any preceding clause, further including controlling using a controller, an actuator that moves the sheathing relative to the air duct and the trailing edge of the propeller to vary the distance between the sheathing and the trailing edge of the propeller to affect the air pressure recovery during the various phases of operation of the turboprop engine.

An aircraft including a fuselage; a pair of wings; and one or more turboprop engines coupled to each of the pair of wings, or to the fuselage, or both. Each of the one or more turboprop engines includes a main nacelle body, a rotatable hub provided on the main nacelle body, a plurality of propellers connected to the rotatable hub, and a nacelle extension coupled to the main nacelle body, the nacelle extension comprising at least one wall defining an air intake inlet. The air intake inlet is movable in an airflow axis with respect to a trailing edge of a propeller in the plurality of propellers to vary a distance between the air intake inlet and the trailing edge of the propeller during various phases of operation of the turboprop engine.

The aircraft of the preceding clause, wherein each of the one or more turboprop engines includes an air duct provided within the nacelle extension, the air duct being configured to provide air to a turbine provided within the main nacelle body. The air intake inlet includes a sheathing fitted over a portion of the air duct, the sheathing being configured to move relative to the air duct and the trailing edge of the propeller to vary a distance between the sheathing and the trailing edge of the propeller during the various phases of operation of the turboprop engine.

Although the foregoing description is directed to the preferred embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A turboprop engine comprising:
   a main nacelle body;
   a rotatable hub provided on the main nacelle body;
   a plurality of propellers connected to the rotatable hub; and
   a nacelle extension coupled to the main nacelle body, the nacelle extension comprising at least one wall defining an air intake inlet,
   wherein the air intake inlet is movable in an airflow axis with respect to a trailing edge of a propeller in the plurality of propellers to vary a distance between the air intake inlet and the trailing edge of the propeller during various phases of operation of the turboprop engine, and
   wherein the air intake inlet comprises an inner lip and an outer lip, the outer lip being located radially outward with respect to a rotation axis of the propeller than the inner lip, and the inner lip and the outer lip are independently movable relative to the trailing edge of the propeller.

2. The turboprop engine according to claim 1, wherein the distance between the air intake inlet and the trailing edge of the propeller is selected to be a first distance for flight Mach less than inlet Mach (M<Mi) and the distance between the air intake inlet and the trailing edge of the propeller is selected to be a second distance for flight Mach greater than inlet Mach (M>Mi), the first distance being greater than the second distance.

3. The turboprop engine according to claim 1, wherein the distance between the air intake inlet and the trailing edge of the propeller is dynamically selected to capture turbocharging from the propeller while avoiding negative back pressurizing of the propeller.

4. The turboprop engine according to claim 1, further comprising an air duct provided within the nacelle extension, the air duct being configured to provide air to a turbine provided within the main nacelle body,
   wherein the air intake inlet comprises a sheathing fitted over a portion of the air duct, the sheathing being configured to move relative to the air duct and the trailing edge of the propeller to vary a distance between the sheathing and the trailing edge of the propeller to optimize air pressure recovery during the various phases of operation of the turboprop engine.

5. The turboprop engine according to claim 4, wherein the sheathing comprises a first sheathing portion and a second sheathing portion, the first sheathing portion defining the outer lip of the air intake inlet and the second sheathing portion defining the inner lip of the air intake inlet, the first sheathing portion being movably coupled to an outer portion of the air duct and the second sheathing portion being movably connected to an inner portion of the air duct.

6. The turboprop engine according to claim 5, wherein the first sheathing portion and the second sheathing portion are independently movable with respect to each other so that the first sheathing portion is extendable to a first distance from the trailing edge of the propeller and the second sheathing portion is extendable to a second distance from the trailing edge of the propeller, the second distance being different from the first distance.

7. The turboprop engine according to claim 5, further comprising a flow diverter extending between the nacelle extension and the main nacelle body, wherein the inner lip of the air intake inlet is separated from the main nacelle body by the flow diverter.

8. The turboprop engine according to claim 4, further comprising an actuator configured to move the sheathing relative to the air duct and the trailing edge of the propeller to vary the distance between the sheathing and the trailing edge of the propeller to optimize the air pressure recovery during the various phases of operation of the turboprop engine.

9. The turboprop engine according to claim 8, further comprising a controller in communication with the actuator, the controller being configured to send a control signal to the actuator to control a movement and a position of the sheathing relative to the trailing edge of the propeller during taxi, take-off, cruise, landing, and the various phases of operation of the turboprop engine.

10. The turboprop engine according to claim 1, wherein the inner lip is closer to the main nacelle body than the outer lip, and the inner lip is separated from the main nacelle body by a flow diverter.

11. The turboprop engine according to claim 10, wherein the outer lip extends closer to the trailing edge of the propeller than the inner lip such that a distance from the outer lip to the trailing edge of the propeller is less than or equal to a distance from the inner lip to the trailing edge of the propeller.

12. The turboprop engine according to claim 10, wherein the outer lip extends farther from the trailing edge of the propeller than the inner lip such that the distance from the outer lip to the trailing edge of the propeller is greater than the distance from the inner lip to the trailing edge of the propeller.

13. The turboprop engine according to claim 10, wherein $R_{TIP}$ is a distance from an axis of rotation of the rotatable hub to a tip of the propeller,
wherein $R_{HUB}$ is a distance from the axis of rotation of the rotatable hub to a root of the propeller,
wherein $R_{INNER}$ is a distance from the axis of rotation of the rotatable hub to the inner lip,
wherein $R_{OUTER}$ is a distance from the axis of rotation of the rotatable hub to the outer lip,
wherein $R_{HUB}$ and $R_{INNER}$ are between 0.15 $R_{TIP}$ and 0.25 $R_{TIP}$, and
wherein $R_{OUTER}$ is between 0.3 $R_{TIP}$ and 0.45 $R_{TIP}$.

14. The turboprop engine according to claim 13, wherein $R_{INNER}$ is greater than $R_{HUB}$ to prevent boundary layer ingestion into the air intake inlet.

15. The turboprop engine according to claim 13, wherein the distance between the air intake inlet and the trailing edge of the propeller is between 0.05 $R_{TIP}$ to 0.3 $R_{TIP}$.

16. A method of optimizing inlet pressure recovery in a turboprop engine comprising a main nacelle body, a rotatable hub provided on the main nacelle body, a plurality of propellers connected to the rotatable hub, and a nacelle extension coupled to the main nacelle body, the nacelle extension comprising at least one wall defining an air intake inlet, the air intake inlet comprising an inner lip and an outer lip, the outer lip being located radially outward with respect to a rotation axis of the plurality of propellers than the inner lip, the method comprising:
moving the air intake inlet in an airflow axis with respect to a trailing edge of a propeller in the plurality of propellers by independently moving the inner lip and the outer lip relative to the trailing edge of the propeller in the plurality of propellers; and
varying, during various phases of operation of the turboprop engine, a distance between the air intake inlet and the trailing edge of the propeller in the plurality of propellers.

17. The method according to claim 16, wherein moving the air intake inlet with respect to the trailing edge of the propeller comprises moving a sheathing relative to an air duct within the nacelle extension for providing air to a turbine provided within the main nacelle body and the trailing edge of the propeller.

18. The method according to claim 17, further comprising controlling, using a controller, an actuator that moves the sheathing relative to the air duct and the trailing edge of the propeller to vary the distance between the sheathing and the trailing edge of the propeller to optimize air pressure recovery during the various phases of operation of the turboprop engine.

19. An aircraft comprising:
a fuselage;
a pair of wings; and
one or more turboprop engines coupled to each of the pair of wings, or to the fuselage, or both, each of the one or more turboprop engines comprising:
a main nacelle body;
a rotatable hub provided on the main nacelle body;
a plurality of propellers connected to the rotatable hub; and
a nacelle extension coupled to the main nacelle body, the nacelle extension comprising at least one wall defining an air intake inlet,
wherein the air intake inlet is movable in an airflow axis with respect to a trailing edge of a propeller in the plurality of propellers to vary a distance between the air intake inlet and the trailing edge of the propeller during various phases of operation of the turboprop engine, and
wherein the air intake inlet comprises an inner lip and an outer lip, the outer lip being located radially outward with respect to a rotation axis of the propeller than the inner lip, and the inner lip and the outer lip are independently movable relative to the trailing edge of the propeller.

20. The aircraft according to claim 19, wherein each of the one or more turboprop engines further comprises an air duct provided within the nacelle extension, the air duct being configured to provide air to a turbine provided within the main nacelle body, wherein the air intake inlet comprises a sheathing fitted over a portion of the air duct, the sheathing being configured to move relative to the air duct and the trailing edge of the propeller to vary a distance between the sheathing and the trailing edge of the propeller during the various phases of operation of the one or more turboprop engines.

* * * * *